UNITED STATES PATENT OFFICE.

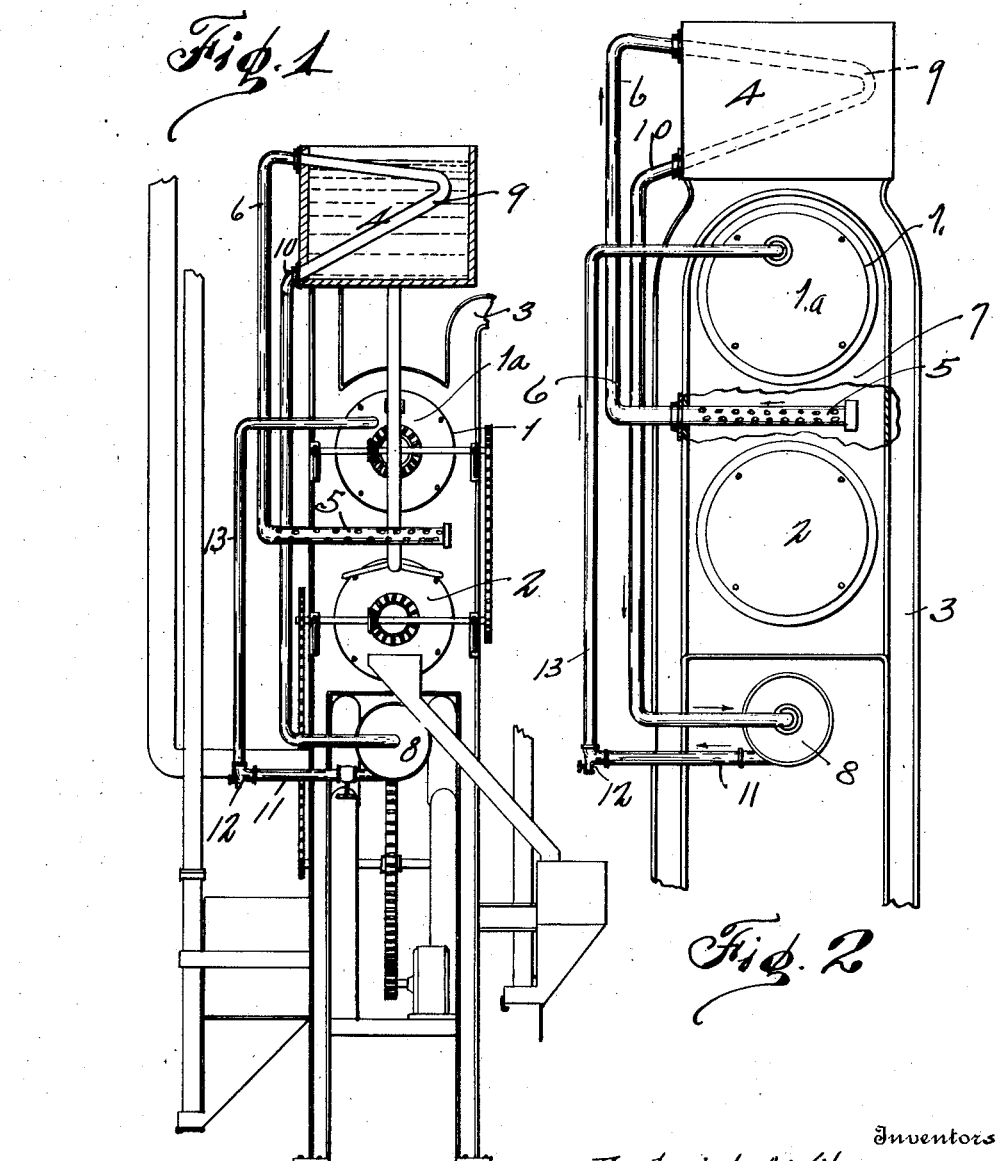

FREDERICK A. WILCOX AND EDWARD L. McGRORY, OF SPOKANE, WASHINGTON.

COFFEE-ROASTING MACHINE.

1,340,692.    Specification of Letters Patent.    Patented May 18, 1920.

Application filed August 5, 1919. Serial No. 315,383.

*To all whom it may concern:*

Be it known that we, FREDERICK A. WILCOX and EDWARD L. MCGRORY, citizens of the United States, residing at Spokane, in Spokane county, and State of Washington, have invented certain new and useful Improvements in Coffee-Roasting Machines, of which the following is a specification.

Our present invention relates to improvements in coffee roasting machines, and particularly to means for preserving, recovering, and restoring, to the coffee while it is being roasted, the flavor or aroma, in order that the quality of the coffee may be maintained during the roasting process and the value of the coffee in the market thus enhanced.

Our invention involves the utilization, in connection with an air tight coffee roasting apparatus, of an air circulation system for the hot air from the roasting chamber in which system means are provided for condensing the moisture taken from the chamber and then the hot air and dry delicate flavors forming the aroma of the coffee are returned to the roasting chamber by forced draft.

In the accompanying drawings one complete embodiment of our invention is illustrated, the parts being combined and arranged according to the best mode we have so far devised for the practical application of the principles of our invention, and as hereinafter claimed the invention consists in certain novel combinations with the roaster of divers pipes, a forced draft fan, a condenser, &c., to be described.

Figure 1 is a view in elevation showing a well known type of coffee roasting machine with our invention therein embodied.

Fig. 2 is a view, somewhat enlarged, showing only the essential parts of the roasting machine to illustrate the invention.

For convenience of illustration and in order that the invention may be readily understood, we have illustrated the roasting machine with its operating parts and mechanism, but as the operating parts of the machine do not form part of the present invention, a specific and detailed description will not be given at this time. The coffee roasting cylinder is indicated by the numeral 1 and its head by the numeral 1ª, while the cooler 2 is located below the roasting cylinder and all parts supported in the upright frame 3, which also supports a condenser tank 4 located at the top of the machine above the roasting cylinder, and adapted to contain a sufficient supply of water that may be replenished in suitable manner, for condensing the steam or vapor that may be generated in the process of roasting.

Within the interior of the roasting chamber is an inlet nozzle 5 fashioned as an enlarged pipe with its end preferably closed, but provided with numerous perforations through its walls for ingress of heated air, moisture, and the aromas or flavors from the roasting coffee to the suction pipe 6 which thus leads from the roasting chamber indicated at 7 in Fig. 2. The suction from the chamber for air through the perforated nozzle is provided by the fan 8 located near the bottom of the machine, below the roasting cylinder 1 and cooler 2, and actuated from power provided to supply the operating parts of the roasting machine, so that the fan may be operated simultaneously with the remaining devices of the roasting apparatus or machine.

The suction pipe 6 extends from the roasting chamber upwardly to the condenser tank, and within the tank a bend, or series of bends to form a coil, as indicated at 9, is provided, it being essential that the outlet part of the bend shall be inclined toward the down or return pipe 10 which is vertically arranged and extends from the condenser tank down to and is connected with the casing of the fan. Thus the fan draws the moisture laden and aromatic air from the interior of the roasting machine up through the condenser which contains water for extracting the heat sufficiently to condense the moisture and this water of condensation thence passes through the return pipe 10 with the dry air and its aroma to the fan. Through condensation pipe 11 leading from the lower part of the fan casing the water of condensation passes to the drip cock 12, and the dry aromatic air is forced, as indicated by the arrows in Fig. 2, up through pipe 13 through the cylinder head 1ª into the roasting cylinder and the coffee.

By this process of treating the roasting coffee we eliminate considerable of the shrinkage lost in the usual manner of roasting coffee, and we also preserve, recover, and return to the roasting machine a large percentage of the very finest, most delicate and valuable flavor or aroma of the coffee, which would otherwise be lost, thus greatly enhancing the value of the coffee.

What we claim is—

1. The combination with the roasting machine, of a condenser tank and an air circulating fan located below the tank and the roasting chamber of the machine, a suction pipe having an inlet nozzle in the roasting machine and a bend in the condenser tank and a continuation of said suction pipe between the bend and the fan, and a return pipe between the fan and the roasting machine.

2. The combination with the roasting machine, of a condenser tank above the machine and an air circulating fan below the roasting part of the machine, a suction pipe from the fan to the condenser and provided with a bend in the condenser and said pipe extending from the condenser to the roasting chamber and provided with an inlet nozzle therein, and a return pipe from the fan to the roasting machine and said return pipe having a portion below the fan and means for disposing of water of condensation in said portion.

In testimony whereof we affix our signatures.

FREDERICK A. WILCOX.
EDWARD L. McGRORY.